Patented May 27, 1941

2,243,701

UNITED STATES PATENT OFFICE 2,243,701

PROCESS FOR PRODUCING BUTANOL-(1)-ONE-(3)

Paul Halbig and Alfred Treibs, Munich, Germany, assignors to Consortium Fur Elektrochemische Industrie G. m. b. H., Munich, Germany, a corporation of Germany No Drawing. Application January 24, 1938, Serial No. 186,696. In Germany February 24, 1937

6 Claims. (Cl. 260—597)

This invention relates to the production of butanol-(1)-one-(3), and has for its object to provide a simple and efficient process for this purpose.

It is well known that by adding water to vinyl acetylene, butene-(1)-one-(3) is obtained, as disclosed for example in German Patent #594,083. We have now found to our surprise that this is not the primary product of the reaction of vinyl acetylene upon water when the reaction is carried out in the presence of hydration catalysts such as acids, mercury compounds, etc. If the escape of butenone from the reaction chamber is prevented, with a corresponding working up of the reaction mixture, the principal reaction product is obtained in the form of butanol-(1)-one-(3). Along with this product small quantities of $\beta,\beta'$-diketo-butyl-ether and butenone are obtained.

Butanol-(1)-one-(3) can also be obtained from butenone, although butenone is an unstable compound which easily passes over into high molecular polymerization products, as do most of the vinyl compounds. The pure butenone transforms into glass-like masses upon standing; this conversion also occurs in the presence of water, which, as we have observed, yields a constant boiling mixture with the ketone of boiling point 72° C./720 mm.

We have now made the surprising discovery that, in spite of this instability, butenone is hydrated to butanolone almost quantitatively in the presence of hydration catalysts; acids being particularly suited for the reaction. The $\beta,\beta'$-diketo-butyl-ether usually occurs as a by-product, the quantity of which can be regulated by means of the water concentration. Thus the quantity of by-product may be kept down to a small amount; but even these small quantities are not lost in the reaction since they can be split up into butenone and can thereby be brought back into the working process.

Butanol-(1)-one-(3) easily splits off, as we have found, one molecule of water both in acid and in alkaline solution and passes into the easily volatile butene-(1)-one-(3). Since on disstillation of the reaction liquid this is first evolved, the equilibrium is upset, so that no butanol-(1)-one-(3) remains. If the reaction solution, however, is treated under accurately neutral conditions, no splitting off of water can occur, and butanol-(1)-one-(3) is obtained.

It has previously been proposed in Patent No. 1,896,161 to prepare butene-(1)-one-(3) by reacting monovinyl acetylene with water in the presence of a hydration catalyst. In an example (1) of that patent vinyl acetylene is shaken in a sealed container with dilute sulphuric acid and mercury sulphate, and the reaction product is neutralized and distilled; when butene-(1)-one-(3) may be salted out of the distillate. Since, however, butanolone was not isolated in this example it is evident that exact neutralization was not accomplished but that the neutral point was missed on one side or the other. The solution must be accurately neutral before butanolone can be isolated therefrom. If the neutralization is not carried out with great care, but a slight excess of acid or alkali is present, then on distillation the butanolone breaks down into butene-(1)-one-(3). If, however, the solution is accurately neutral, then water distills off first and butanol-(1)-one-(3) remains behind and may be purified preferably by distillation in vacuo.

Example 1

Vinyl acetylene is introduced into a solution of 100 parts of water, 20 parts of concentrated sulphuric acid and 2 parts of mercury oxide, heated to a temperature of 70° C., whereby the vinyl acetylene is mostly absorbed. After absorption of, for example, 15 parts of vinyl acetylene the acid is exactly neutralized, for example with sodium hydroxide and the reaction products are driven off in vacuo. Butanolone together with small quantities of butene-(1)-one-(3) and $\beta,\beta'$-diketo-butyl-ether are mainly obtained.

This method of operation may be varied in accordance with the conventional process for producing butenone, and care must be taken that no butenone is driven off as long as the reaction mass is acid.

Example 2

1 part butenone is allowed to stand with 2 parts of N-sulphuric acid at room temperature for about 24 hours, whereupon about 92% is converted. The acid is then exactly neutralized, and upon distillation 65% of the ketone is obtained as butanolone, 10% as butenone, and the balance as $\beta,\beta'$-diketo-butyl-ether with small quantities of residue.

The above examples are given only by way of illustration. Instead of sulphuric acid other acids may be used, and the concentration of the reaction components and of the catalysts may be optionally varied, as may also the reaction temperature and time. At higher temperatures the reaction takes place in a shorter time with small consumption of catalyst.

The invention claimed is:

1. Process for producing butanol-(1)-one-(3) which comprises subjecting vinyl acetylene to the action of water in the presence of a hydration catalyst under conditions to form butanol-(1)-one-(3), neutralizing the hydration catalyst when the reaction has proceeded to the desired point so as to prevent further reaction, and removing the butanol-(1)-one-(3) by distillation under conditions to prevent butene-(1)-one-(3) from being driven off.

2. Process for producing butanol-(1)-one-(3) which comprises subjecting vinyl acetylene to the action of water in the presence of sulphuric acid and compounds of mercury and other metals under conditions to form butanol-(1)-one-(3), neutralizing the hydration catalyst when the reaction has proceeded to the desired point so as to prevent further reaction, and removing the butanol-(1)-one-(3) by distillation under conditions to prevent butene-(1)-one-(3) from being driven off.

3. Process for producing butanol-(1)-one-(3) which comprises subjecting butene-(1)-one-(3) to the action of water in the presence of a hydration catalyst under conditions to form butanol-(1)-one-(3), neutralizing the catalyst when the reaction has proceeded to the desired point so as to prevent reconversion to butene-(1)-one-(3), and removing the butanol-(1)-one-(3) by distillation under conditions to prevent butene-(1)-one-(3) from being driven off.

4. Process for producing butanol-(1)-one-(3) which comprises subjecting butene-(1)-one-(3) to the action of water in the presence of a catalyst selected from the group consisting of acids under conditions to form butanol-(1)-one-(3), neutralizing the catalyst when the reaction has proceeded to the desired point so as to prevent reconversion to butene-(1)-one-(3), and removing the butanol-(1)-one-(3) by distillation under conditions to prevent butene-(1)-one-(3) from being driven off.

5. Process for producing butanol-(1)-one-(3) which comprises subjecting an unsaturated compound selected from the group consisting of vinyl acetylene and butene-(1)-one-(3) to the action of water in the presence of a hydration catalyst under conditions to form butanol-(1)-one-(3), neutralizing the hydration catalyst when the reaction has proceeded to the desired point so as to prevent further reaction, and removing the butanol-(1)-one-(3) by distillation under conditions to prevent butene-(1)-one-(3) from being driven off.

6. Process for preparing butanol-(1)-one-(3) which comprises reacting vinyl acetylene with water under conditions adapted to hydrolyze the triple bond and the double bond.

PAUL HALBIG.
ALFRED TREIBS.